US011927044B2

(12) United States Patent
Dallmann et al.

(10) Patent No.: US 11,927,044 B2
(45) **Date of Patent: *Mar. 12, 2024**

(54) WINDOW OPERATOR HANDLE AND COVER WITH MAGNETIC SECURING FEATURES

(71) Applicant: Truth Hardware Corporation, Owatonna, MN (US)

(72) Inventors: Brian Dallmann, Owatonna, MN (US); Eric Fickas, Plain City, OH (US); Jonathan P. Hickman, Rochester, MN (US); Gregory J. Vetter, Owatonna, MN (US)

(73) Assignee: Truth Hardware Corporation, Owatonna, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,728

(22) Filed: Apr. 25, 2022

(65) Prior Publication Data

US 2022/0341238 A1 Oct. 27, 2022

Related U.S. Application Data

(60) Provisional application No. 63/178,818, filed on Apr. 23, 2021.

(51) Int. Cl.
*E05F 11/16* (2006.01)
*E05F 11/22* (2006.01)

(52) U.S. Cl.
CPC .............. *E05F 11/16* (2013.01); *E05F 11/22* (2013.01); *E05Y 2201/68* (2013.01); *E05Y 2900/148* (2013.01)

(58) Field of Classification Search
CPC . E05F 11/02; E05F 11/16; E05F 11/34; E05F 11/10; Y10S 16/90; Y10S 16/473; Y10S 292/12; Y10S 292/57; Y10T 74/20744; Y10T 292/57; Y10T 74/20756; E05D 15/30
USPC ................................................ 49/359; 16/429
See application file for complete search history.

(56) References Cited

U.S. PATENT DOCUMENTS

| | | | | | |
|---|---|---|---|---|---|
| 3,520,487 | A * | 7/1970 | Andre | G01B 3/1005 | 242/395.1 |
| 5,400,473 | A * | 3/1995 | Delman | E05F 11/16 | 74/545 |
| 5,443,570 | A * | 8/1995 | Hirano | A01K 89/006 | 242/284 |
| 5,467,503 | A * | 11/1995 | Nolte | E05F 11/34 | 74/557 |
| 6,640,389 | B2 * | 11/2003 | Van Klompenburg | E05F 11/16 | 49/339 |
| 7,066,505 | B2 * | 6/2006 | Van Klompenburg | E05F 11/16 | 292/336.3 |
| 7,194,930 | B2 * | 3/2007 | Dawson | E05B 1/0092 | 242/283 |

(Continued)

OTHER PUBLICATIONS

Co-pending U.S. Appl. No. 17/859,464, and entitled "Window Operator Handle and Cover With Magnetic Securing Features and Detent."

*Primary Examiner* — Justin B Rephann
(74) *Attorney, Agent, or Firm* — Bradley J. Thorson

(57) ABSTRACT

A window operator handle and cover with magnetic features that enable the handle to be retained to the cover in a folded position. The operator cover can also be attached to the operator with magnets.

19 Claims, 8 Drawing Sheets

(56) References Cited

U.S. PATENT DOCUMENTS

| | | | | |
|---|---|---|---|---|
| 7,251,860 | B2 * | 8/2007 | Liang | E05F 11/16 74/547 |
| 7,464,619 | B2 | 12/2008 | Vetter | |
| 9,003,706 | B2 * | 4/2015 | Meves | E05F 9/00 49/246 |
| D913,783 | S | 3/2021 | Nolte | |
| 2005/0212305 | A1 * | 9/2005 | Gill | E05F 11/16 292/336.3 |
| 2006/0260099 | A1 * | 11/2006 | Liang | E05F 11/16 16/429 |
| 2008/0066382 | A1 * | 3/2008 | Erickson | E05B 13/10 49/246 |
| 2013/0312331 | A1 * | 11/2013 | Bourgoin | E05F 11/10 49/386 |
| 2014/0026709 | A1 * | 1/2014 | Derham | E05F 11/24 74/528 |
| 2014/0069016 | A1 * | 3/2014 | Perry | E05F 15/40 49/31 |
| 2019/0383069 | A1 * | 12/2019 | Guelck | E05C 17/505 |
| 2020/0263475 | A1 * | 8/2020 | Hollermann | E05F 11/02 |

* cited by examiner

WINDOW OPERATOR HANDLE AND COVER WITH MAGNETIC SECURING FEATURES

RELATED APPLICATION

The present application claims the benefit of U.S. Provisional Application No. 63/178,818 filed Apr. 23, 2021, said application being hereby incorporated herein in its entirety by reference.

TECHNICAL FIELD

This application relates to window operator handles and covers, and more specifically to casement and awning window operator handles and covers.

BACKGROUND

Casement and awning windows are typically opened and closed with an operator. The windows have a frame that forms an opening in a wall of a structure, and a sash is hinged to the frame to open and close the opening. The operator enables a user to drive the sash between open and closed positions, typically by a crank handle. An example of such an operator is disclosed in U.S. Pat. No. 7,464,619, owned by the owners of the present application, and hereby fully incorporated herein by reference.

The operator mechanism visible from the interior is typically concealed under an operator cover, a folding crank handle is engaged with the operator drive, and the handle may be secured in place on the cover by a feature formed in the cover. An example of such a handle and operator cover is disclosed in U.S. Design Pat. No. D913,783, owned by the owners of the present application, and hereby fully incorporated herein by reference.

A drawback of prior operator handles and covers, however, is that the folding handles are held in the closed position by mechanical methods, physical ledges, or pockets on the cover which engage with the handle or features on the handle. This can lead to dirt and dust collecting in the handle or cover features, difficulty for a user to ensure that the handle is properly engaged in the cover upon completing opening and closing of the window, and a cluttered aesthetic appearance to the handle and cover overall. Also, if cover recesses are used for the handle, the user can have difficulty grasping the handle with their fingers to extract the handle from a recess to operate the handle.

Moreover, the operator cover is usually attached to the operator with one or more mechanical pins, latches, or snap features. These mechanical attachment methods can be difficult to manipulate if it becomes necessary to detach the operator cover from the operator, and can be inadvertently broken.

What is needed is an operator handle and cover assembly that addresses the drawbacks of prior devices.

SUMMARY OF THE DISCLOSURE

The inventions described in the present application address the drawbacks of prior devices by providing a handle that is secured in place on an operator cover with magnetic features, thereby eliminating the need for mechanical securing features, such as projections or recesses in either the handle or the cover. Further, since the handle is not received in a recess of the cover, the handle is easier for a user to grasp in order to unfold it into a position for operating the handle.

Magnetic features enable the handle to be positioned with a smoother appearance to the cover and help the handle self-locate to the cover. This means the user does not need to be as careful when folding the handle down and positioning the handle for storage. The magnets also secure the handle from falling away due to gravity from the cover into a drooping position.

In embodiments, the operator cover can also be attached to the operator with magnets. In such embodiments, the operator cover can be easily detached from the operator by simply pulling the cover away from the operator.

According to an embodiment, a window operator handle and cover assembly includes a shell adapted to be received on a window operator, the shell having a first magnetic handle securing component, and a handle portion adapted to couple with a rotatable drive of the window operator, the handle portion being shiftable between a folded position in which a lower surface of the handle portion abuts an outer surface of the shell and an unfolded position in which the lower surface of the handle portion is spaced apart from the outer surface of the shell. The handle portion has a second magnetic handle securing component disposed proximate the first magnetic handle securing component when the handle portion is in the folded position, wherein a mutual magnetic attraction between the first magnetic handle securing component and the second magnetic handle securing component secures the handle portion in the folded position.

The first magnetic handle securing component and the second magnetic handle securing component can each be magnets, or one of the first magnetic handle securing component or the second magnetic handle securing component can be a magnet and the other of the first magnetic handle securing component and the second magnetic handle securing component can be ferrous metal. At least one of the first magnetic handle securing component and the second magnetic handle securing component can be a neodymium magnet.

In embodiments, the shell can define a recess adapted to receive a portion of the window operator, a housing defining a cavity being disposed within the recess, the first magnetic handle securing component being received in the cavity. The handle portion can include a body defining a recess, a housing defining a cavity being disposed within the recess, the first magnetic handle securing component being received in the cavity. The handle portion can include a bottom cover at least partially covering the recess in the body.

In further embodiments, the shell can include a plurality of magnetic cover securing components, each one of the plurality of first magnetic cover securing components disposed so as to correspond with a separate one of a plurality of second magnetic cover securing components disposed on the window operator. A mutual magnetic attraction between each of the first magnetic cover securing components and the corresponding second magnetic cover securing component secures the cover portion to the window operator.

In an embodiment, a window operator assembly includes a window operator adapted to couple with a movable sash of a window, and a window operator handle and cover assembly. The window operator handle and cover assembly can include a shell received on the window operator, the shell having a first magnetic handle securing component, and a handle portion coupled with a rotatable drive of the window operator. The handle portion is shiftable between a folded position in which a lower surface of the handle portion abuts an outer surface of the shell and an unfolded position in which the lower surface of the handle portion is spaced apart from the outer surface of the shell. The handle portion has a second magnetic handle securing component disposed proximate the first magnetic handle securing component when the handle portion is in the folded position. A mutual magnetic attraction between the first magnetic handle securing component and the second magnetic handle securing component secures the handle portion in the folded position.

The first magnetic handle securing component and the second magnetic handle securing component can each be magnets, or one of the first magnetic handle securing component or the second magnetic handle securing component can be a magnet and the other of the first magnetic handle securing component and the second magnetic handle securing component can be ferrous metal. At least one of the first magnetic handle securing component and the second magnetic handle securing component can be a neodymium magnet.

In embodiments, the shell can define a recess receiving a portion of the window operator, a housing defining a cavity being disposed within the recess, the first magnetic handle securing component being received in the cavity. The handle portion can include a body defining a recess, a housing defining a cavity being disposed within the recess, the first magnetic handle securing component being received in the cavity. A bottom cover can at least partially cover the recess in the body.

In further embodiments, the shell can include a plurality of magnetic cover securing components, each one of the plurality of first magnetic cover securing components disposed so as to correspond with a separate one of a plurality of second magnetic cover securing components disposed on the window operator, wherein a mutual magnetic attraction between each of the first magnetic cover securing components and the corresponding second magnetic cover securing component secures the cover portion to the window operator.

The summary above is not intended to describe each illustrated embodiment or every implementation of the present disclosure. The figures and the detailed description that follow more particularly exemplify these embodiments.

BRIEF DESCRIPTION OF THE DRAWINGS

Subject matter hereof may be more completely understood in consideration of the following detailed description of various embodiments in connection with the accompanying figures, in which.

Figure 1:
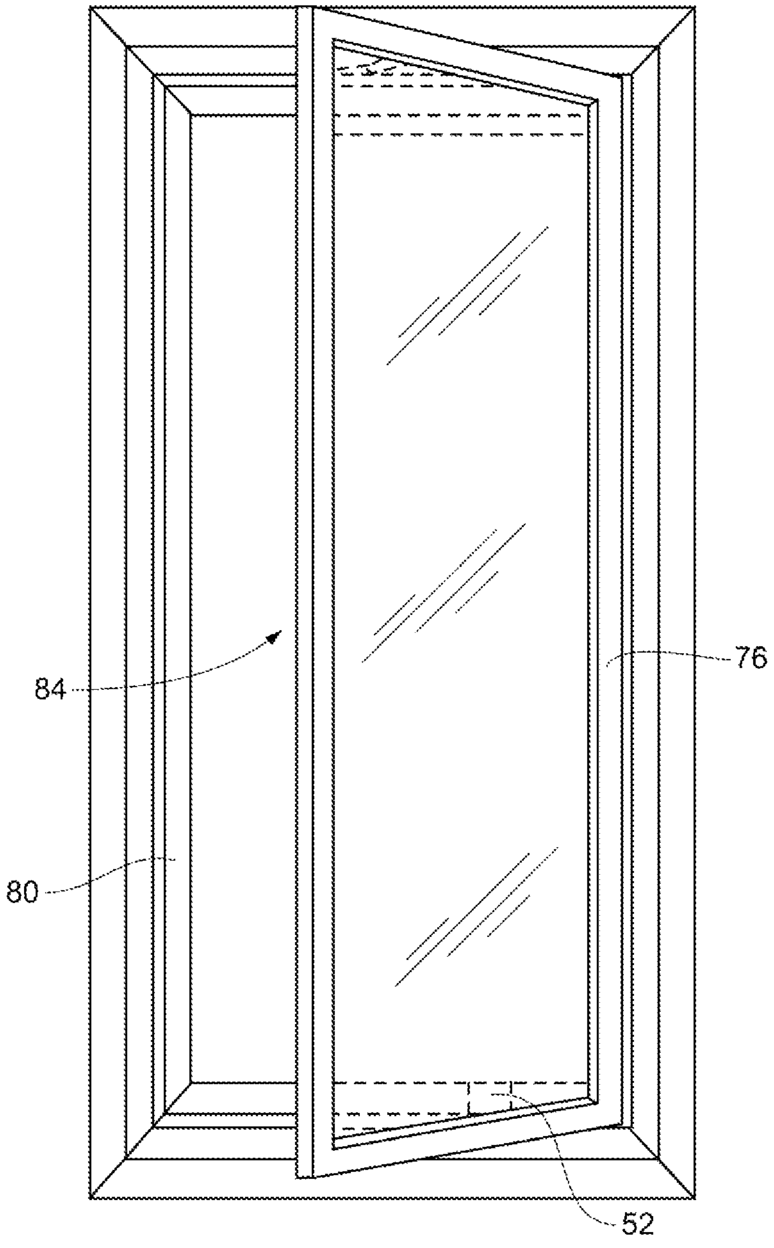
FIG. 1 is an outside elevation view of a casement window with an operator having an operator cover and handle according to embodiments of the invention.
Figure 2:
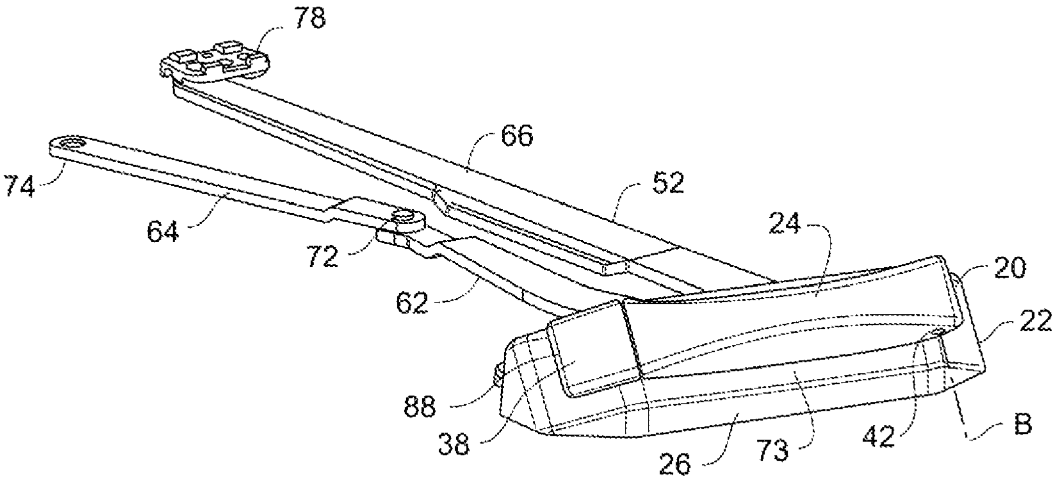
FIG. 2 is a front isometric view of an operator cover and handle according to an embodiment of the invention, with the operator cover and handle attached to an operator.
Figure 3:
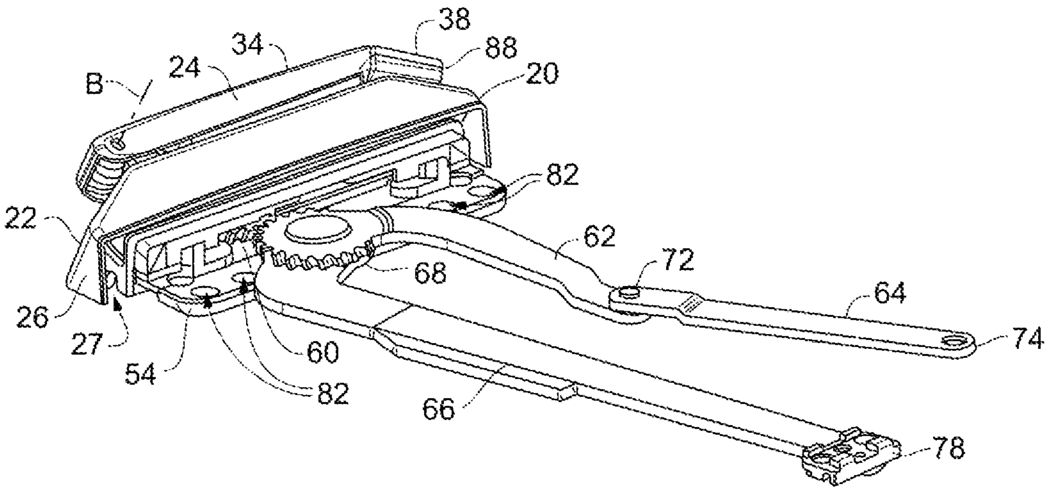
FIG. 3 is a rear isometric view of the operator cover and handle of FIG. 2, with the operator cover and handle attached to an operator.
Figure 4:
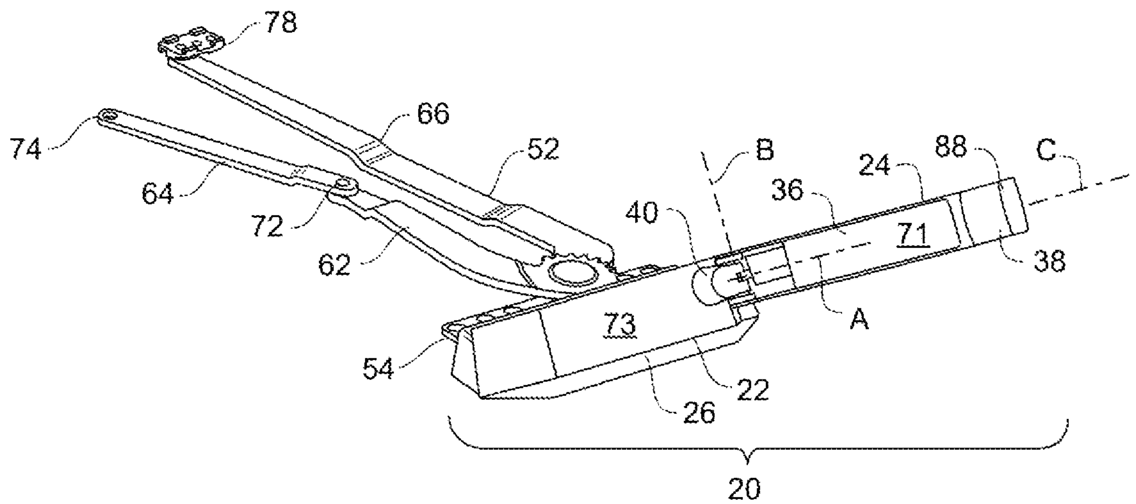
FIG. 4 is a front isometric view of the operator cover and handle of FIG. 2, with the operator cover and handle attached to an operator and with the handle in an unfolded position.
Figure 5:
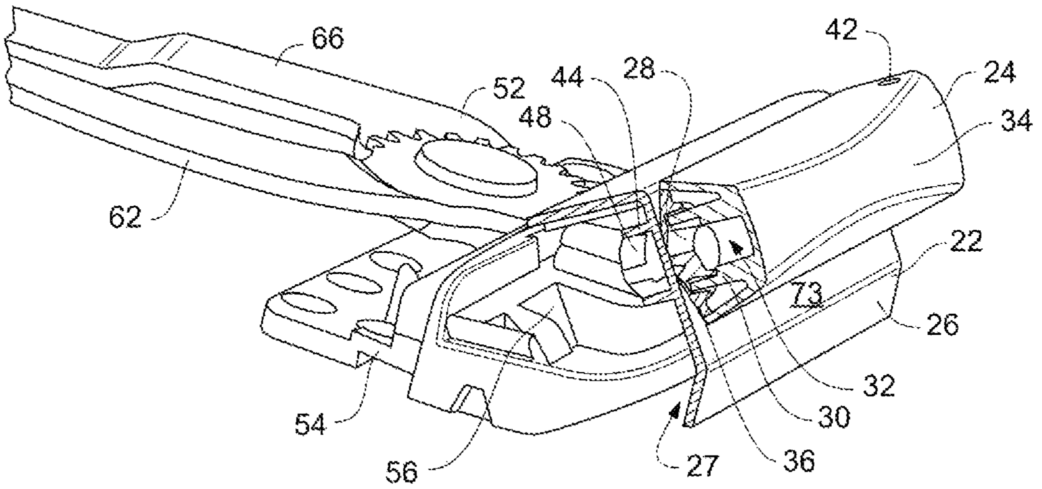
FIG. 5 is a front isometric view of the operator cover and handle of FIG. 2, with the operator cover and handle attached to an operator, and with the operator cover and handle depicted in cross-section.
Figure 6:
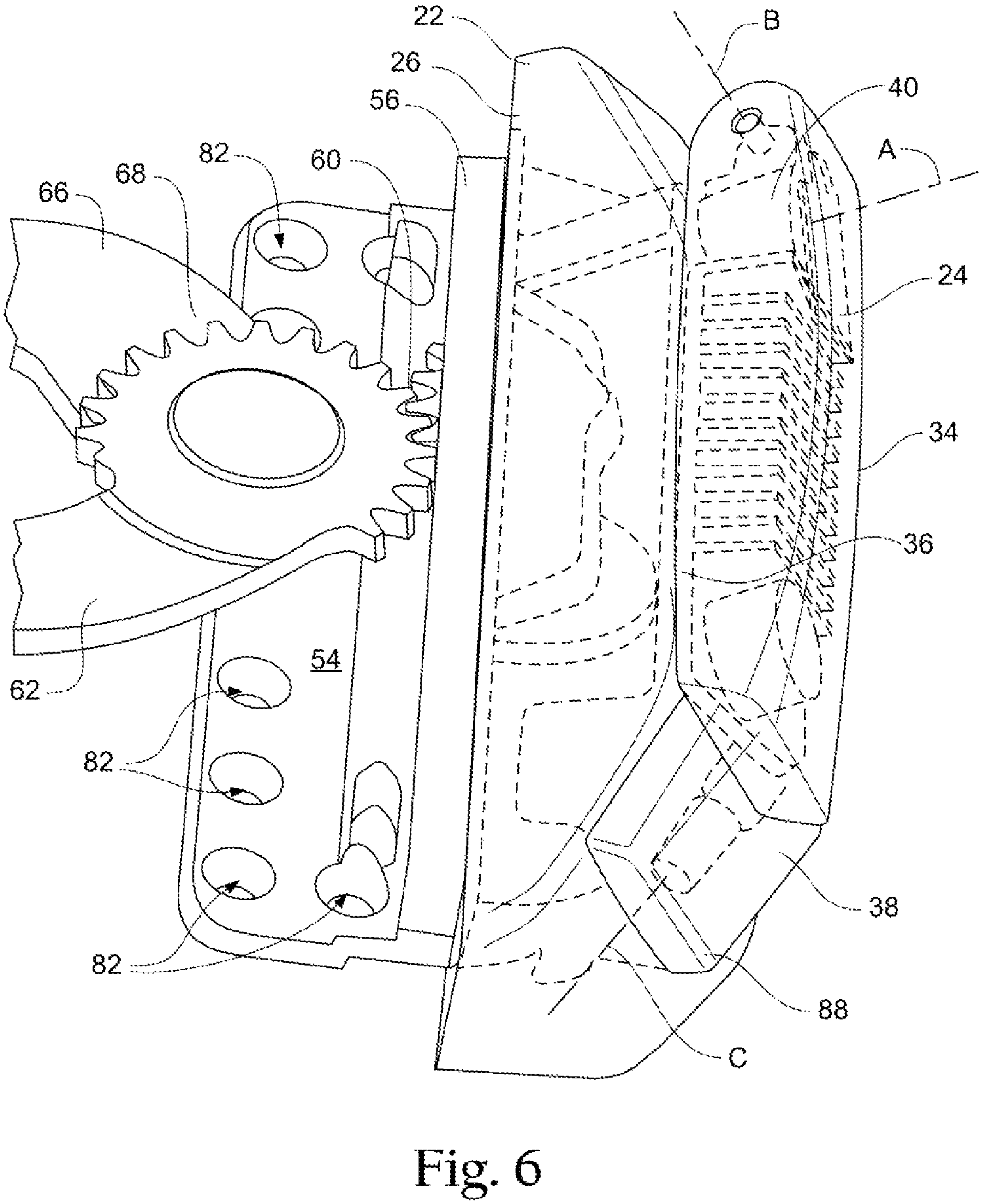
FIG. 6 is an isometric view of the operator cover and handle of FIG. 2, with the operator cover and handle attached to an operator, and with the exterior portions of the cover and handle depicted as transparent.
Figure 7:
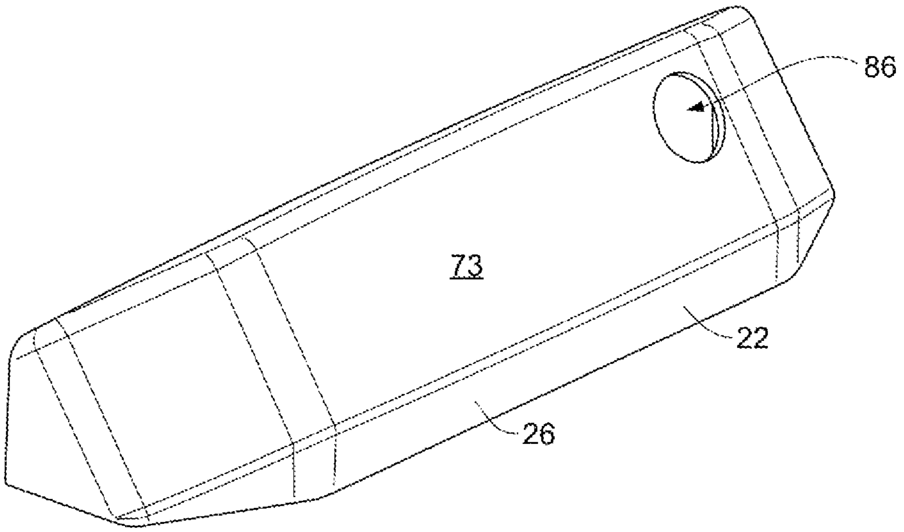
FIG. 7 is a front isometric view of the operator cover of FIG. 2.
Figure 8:
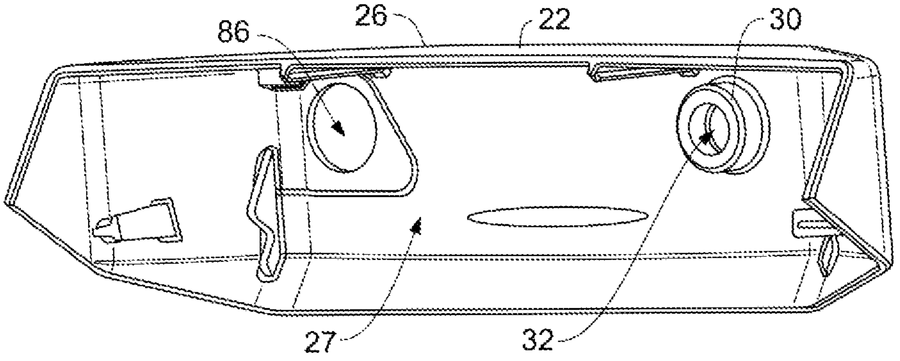
FIG. 8 is a rear isometric view of the operator cover of FIG. 2.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Figure 9:
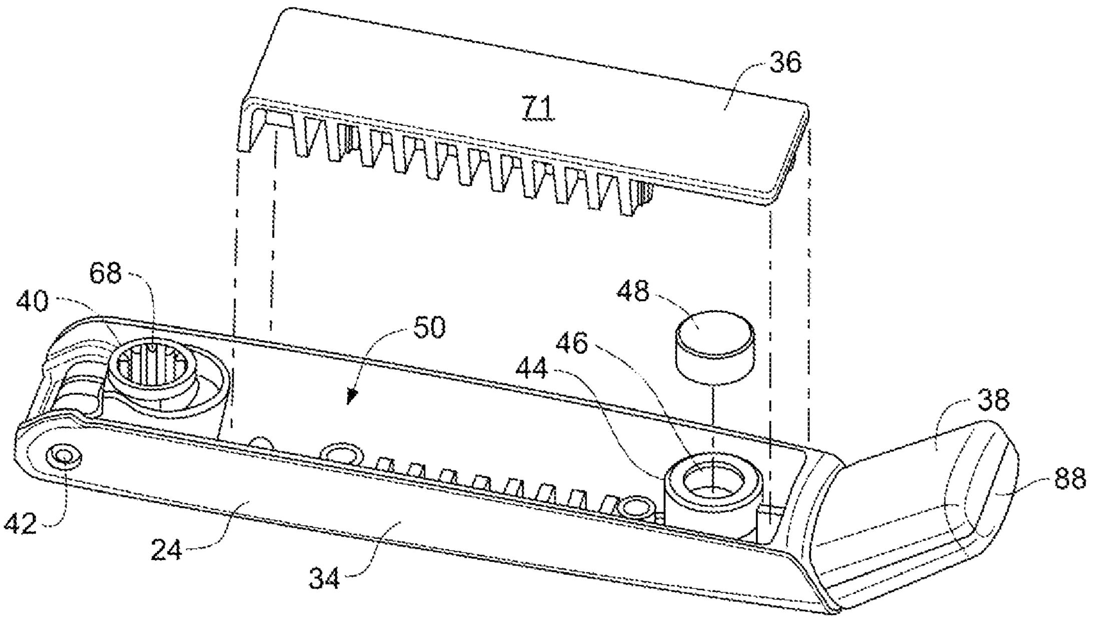
FIG. 9 is a partially exploded view of the handle of the operator cover and handle of FIG.
Figure 10:
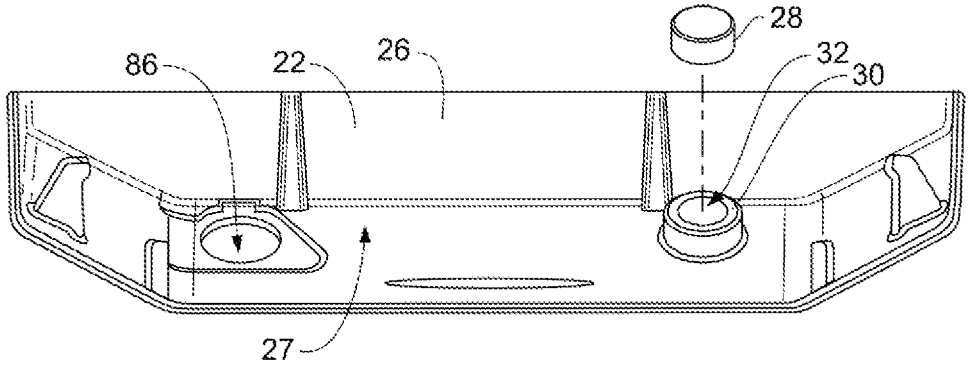
FIG. 10 is a partially exploded view of the cover of the operator cover and handle of FIG. 2.

There are depicted in FIGS. 2-12 embodiments of a window operator handle and cover assembly 20 according to embodiments of the invention. Operator handle and cover assembly 20 generally includes cover assembly 22 and handle assembly 24. As depicted in FIG. 10, cover assembly 22 generally includes shell 26 defining recess 27, and handle securing component 28. Shell 26 generally includes housing 30 inside recess 27, and defining cavity 32, which in turn receives magnetic handle securing component 28.

As depicted in FIG. 9, handle assembly 24 generally includes handle body 34, bottom cover 36, finger-grippable handle knob 38 which may be rotatable relative to handle body 34 about axis C, and operator drive interface 40 which is pivotally attached to handle body 34 with pin 42. Handle body 34 generally includes housing 44 defining cavity 46 which receives magnetic handle securing component 48. Bottom cover 36 is snap-fitted to handle body 34 to cover recess 50 defined by handle body 34.

In embodiments of the invention, both magnetic handle securing components 28, 48, may be mutually attracting magnets, or one or the other may be made of a ferrous metal capable of being attracted by a magnet, and the other a magnet. In preferred embodiments, the magnets used for handle securing components 28, 48, can be neodymium or other high magnetic strength disc magnets as are commonly available. Of course, it will be appreciated that handle securing components 28, 48, can be made from any other suitable magnetic materials or materials attracted to a magnet, and can be any suitable shape. Moreover, it will be appreciated that although magnetic handle securing components 28, 48, are described above as being received in recesses 32, 46, defined by housings 30, 44, they may also be otherwise attached to or molded in shell 26, handle body 34, or knob 38. Also, although only one each of magnetic handle securing components 28, 48, is depicted, it will be appreciated any number of pairs of magnetic handle securing components 28, 48, can be used. Still further, magnetic handle securing components 28, 48, may be mounted so as to be visible from the exterior when handle assembly 34 is in the unfolded position depicted in FIG. 4. Those skilled in the art will also appreciate that the overall magnetic force exerted by a magnet can be enhanced by a proximate, magnetically active, ferrous metal component. Hence, a separate magnetically active component, for example a piece of ferrous metal, could be added within, or proximate to, housings 30, 44, to enhance the magnetic effect of any magnet used as one of magnetic handle securing components 28, 48.

As depicted in FIGS. 2-6, operator cover and handle assembly 20 is attached to a window operator assembly 52. A typical dual-arm window operator assembly 52 is depicted in exemplary fashion in FIGS. 1, 2-6, 11, and 13, and generally includes base plate 54, gear housing 56, a rotatable drive in the form of worm gear 58, transfer gear 60, first arm 62, pivot arm 64, and second arm 66. First arm 62 has toothed portion 68 engaged with transfer gear 60, which is in turn engaged with worm gear 58. As will be known to those skilled in the art, second arm 66 is coupled to first arm 62 such that first arm 62 and second arm 66 pivot in opposite rotational directions as worm gear 58 is rotated. Gear housing 56 mates with base plate 54 to retain and cover worm gear 58 and transfer gear 60. Operator drive interface 40 has splines 68 with mate with splines (not depicted) on shall 70 of worm gear 58 so that worm gear 58 is rotatable using handle assembly 24. Pivot arm 64 is coupled to first arm 62 at pivot 72. Distal end 74 of pivot arm 64 is pivotally attached to window sash 76, and slide shoe 78 is pivotally attached to second arm 66. Slide shoe 78 is slidable in a track (not depicted) on window sash 76. Base plate 54 is secured to window frame 80 with fasteners (not depicted) received through apertures 82. Window sash 76 is coupled to window frame 80 with hinges (not depicted) so that window sash 76 can swing to open and close opening 84 defined by window frame 80. Hence, as handle assembly 24 is rotated by a user, window sash 76 is swung between open and closed positions.

Cover assembly 22 fits over and is secured to base plate 54 or gear housing 56 of window operator assembly 52 with shaft 70 of worm gear 58 extending through aperture 86 defined in cover assembly 22. As described above, operator drive interface 40 of handle assembly 24 is coupled to shaft 70 of worm gear 58 with splines 68.

With handle assembly 24 in a folded position as depicted in FIGS. 2, 3, 5, and 6, lower surface 71 of handle portion 24 abuts outer surface 73 of shell 26, and magnetic handle securing component 28 in cover assembly 22 is positioned proximate to magnetic handle securing component 48 in handle assembly 24. The mutual magnetic attraction between magnetic handle securing component 28 and magnetic handle securing component 48 secures handle assembly 24 in place. When it is desired to open or close window sash 76, distal end 88 of handle assembly 24 can be pulled outward, disengaging magnetic handle securing components 28, 48, and pivoting handle assembly 24 about axis B of pin 42 to dispose handle assembly 24 in the unfolded position depicted in FIG. 4. In this unfolded position, handle assembly 24 can be rotated in either direction about axis A, driving worm gear 58 to thereby open or close window sash 76. Once window sash 76 is in the desired position, handle assembly 24 can be rotated about axis B of pin 42 to return handle assembly 24 to the folded position depicted in FIG. 2, reengaging magnetic handle securing components 28, 48, and securing handle assembly 24 to cover assembly 22.

Figure 11:
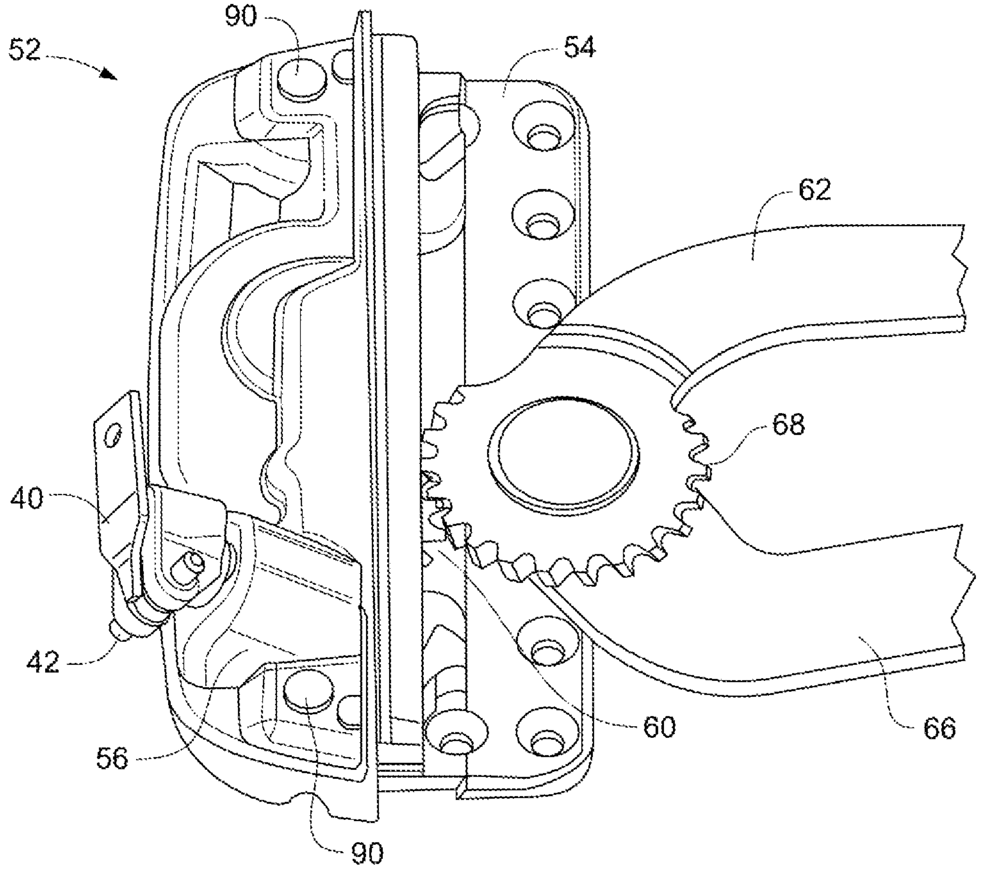
FIG. 11 is an isometric view of an operator according to an embodiment of the invention with the operator cover and handle omitted for clarity.
Figure 12:
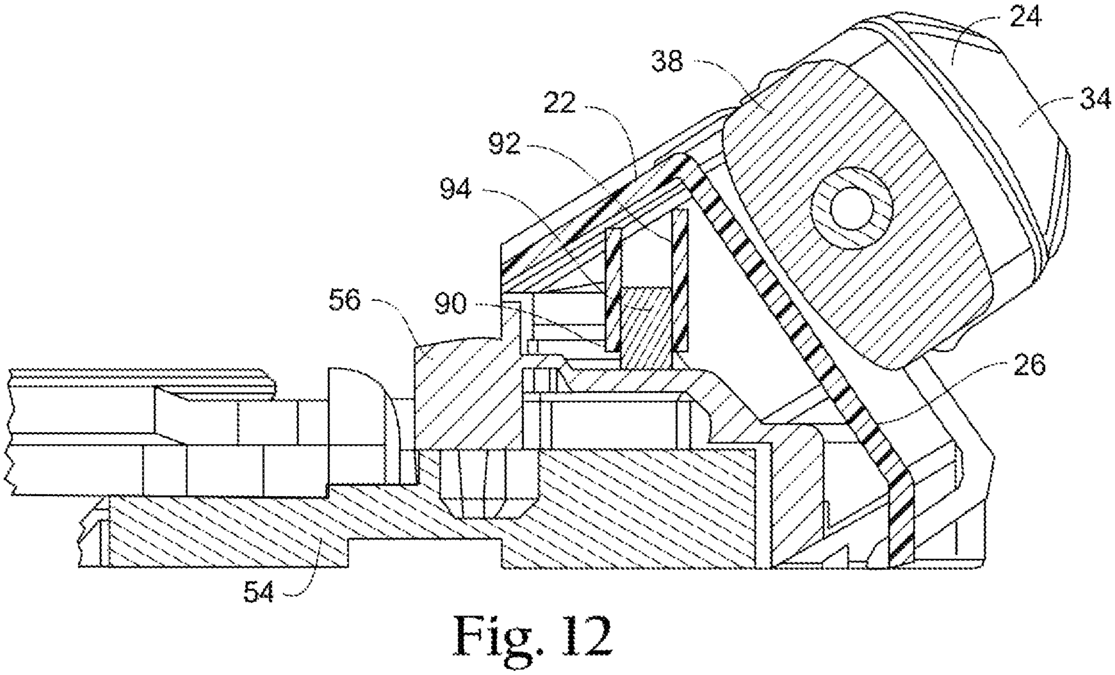
FIG. 12 is a cross-sectional view of an operator cover and handle according to an embodiment of the invention, depicting a magnetic attachment feature for the operator cover.
Figure 13:
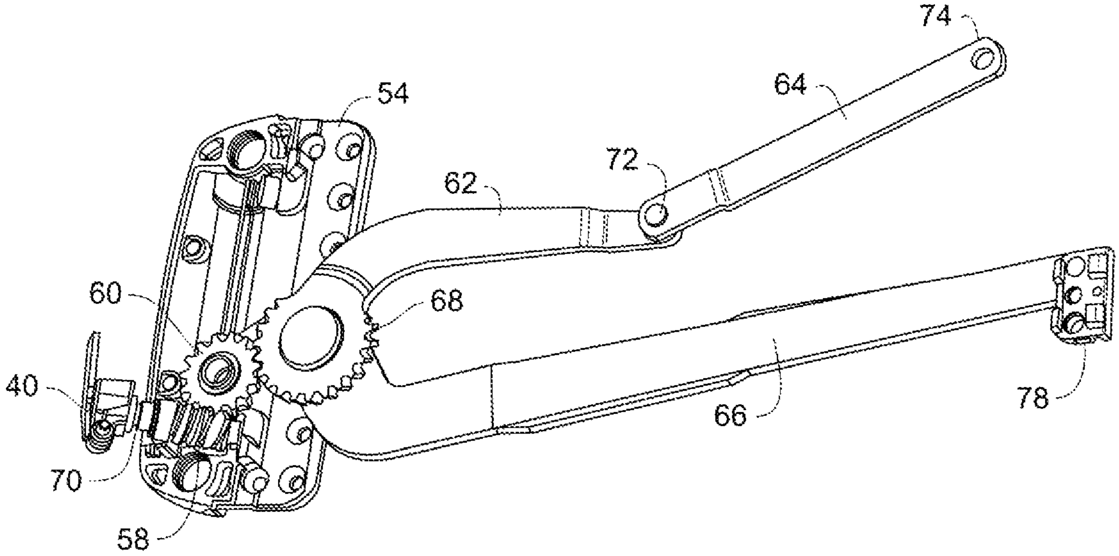
FIG. 13 is a partial isometric view of the window operator depicted in FIG. 2.

Optionally, as depicted in FIGS. 11 and 12, cover assembly 22 can also be secured in place on window operator assembly 52 with magnetic features. In the depicted embodiment, window operator assembly 52 has magnetic cover securing components 90 disposed on window operator assembly 52. Cover assembly 22 has housings 92, positioned so as to correspond to magnetic cover securing components 90. Each of housings 92 receives a magnetic cover securing component 94. Again, magnetic cover securing components 90, 94, may be mutually attracting magnets, or one or the other may be made of a ferrous metal capable of being attracted by a magnet, and the other a magnet. Through the mutual attraction of magnetic cover securing components 90, 94, cover assembly 22 can be held securely in place on operator assembly 52. When it is desired to remove cover assembly 22, cover assembly 22 can be simply lifted upwardly to disengage magnetic cover securing components 90, 94. It will be appreciated by those of skill in the art that these magnetic cover securing components 90, 94 can be located and selected so that cover assembly 22 will not be unintentionally dislodged from window operator assembly 52 due to routine operation and maintenance of window operator handle and cover assembly 20. Again, those skilled in the art will also appreciate that the overall magnetic force exerted by a magnet can be enhanced by a proximate, magnetically active, ferrous metal component. Hence, a separate magnetically active component, for example a piece of ferrous metal, could be added within, or proximate to, housings 92 or magnetic cover securing components 90, to enhance the magnetic effect of any magnet used as one of magnetic handle securing components 90, 94.

It will be appreciated that although a dual-arm type operator is depicted, operator handle and cover assembly 20 can be adapted for use with any type or configuration of window operator. Moreover, although a casement window is depicted, the operator handle and cover assembly 20 can be used with any other type of window, for example awning style windows.

Hence, it will be appreciated that, by positioning a pair of magnets or a magnet and matching ferrous metal component on or in cover assembly 22 and a corresponding magnet and matching ferrous metal component in or on handle assembly 24, the handle securing components 28, 48, interact, helping to position and secure the handle assembly 24 in a folded position without the need for projections, notches, or recesses on cover assembly 22 to engage with handle assembly 24. As described, handle securing components 28, 48, can be attached inside cover assembly 22 and handle assembly 48, respectively, or molded into cover assembly 22 and handle assembly 48 for improved aesthetics and functionality. It will be appreciated that there may be an additional advantage to using a ferrous metal component for handle securing component 28 (rather than a magnet) to avoid attraction of metal particles or dust which may abrade and damage the finish of shell 26 over time. Similarly, cover assembly 22 can be secured to window operator assembly 52 with strategically located magnetic cover securing components 90, 94, to improve serviceability of window operator assembly 52.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A window operator handle and cover assembly comprising:

a shell adapted to be received on a window operator, the shell having a first magnetic handle securing component, wherein the shell defines a recess adapted to receive a portion of the window operator, a housing defining a cavity being disposed within the recess, the first magnetic handle securing component being received in the cavity; and a handle portion adapted to couple with a rotatable drive of the window operator, the handle portion being shiftable between a folded position in which a lower surface of the handle portion abuts an outer surface of the shell and an unfolded position in which the lower surface of the handle portion is spaced apart from the outer surface of the shell, the handle portion having a second magnetic handle securing component disposed proximate the first magnetic handle securing component when the handle portion is in the folded position, wherein a mutual magnetic attraction between the first magnetic handle securing component and the second magnetic handle securing component secures the handle portion in the folded position.

2. The window operator handle and cover assembly of claim 1, wherein the first magnetic handle securing component and the second magnetic handle securing component are each magnets.

3. The window operator handle and cover assembly of claim 1, wherein one of the first magnetic handle securing component or the second magnetic handle securing component is a magnet and the other of the first magnetic handle securing component and the second magnetic handle securing component comprises ferrous metal.

4. The window operator handle and cover assembly of claim 1, wherein at least one of the first magnetic handle securing component and the second magnetic handle securing component is a neodymium magnet.

5. The window operator handle and cover assembly of claim 1, wherein the shell further comprises a plurality of magnetic cover securing components, each one of a plurality of first magnetic cover securing components disposed so as to correspond with a separate one of a plurality of second magnetic cover securing components disposed on the window operator, wherein a mutual magnetic attraction between each of the first magnetic cover securing components and the corresponding second magnetic cover securing component secures the cover portion to the window operator.

6. A window operator handle and cover assembly comprising:

a shell adapted to be received on a window operator, the shell having a first magnetic handle securing component; and a handle portion adapted to couple with a rotatable drive of the window operator, the handle portion being shiftable between a folded position in which a lower surface of the handle portion abuts an outer surface of the shell and an unfolded position in which the lower surface of the handle portion is spaced apart from the outer surface of the shell, the handle portion having a second magnetic handle securing component disposed proximate the first magnetic handle securing component when the handle portion is in the folded position, wherein a mutual magnetic attraction between the first magnetic handle securing component and the second magnetic handle securing component secures the handle portion in the folded position, and wherein the handle portion comprises a body defining a recess, a housing defining a cavity being disposed within the recess, the second magnetic handle securing component being received in the cavity.

7. The window operator handle and cover assembly of claim 6, further comprising a bottom cover at least partially covering the recess in the body.

8. The window operator handle and cover assembly of claim 6, wherein the first magnetic handle securing component and the second magnetic handle securing component are each magnets.

9. The window operator handle and cover assembly of claim 6, wherein one of the first magnetic handle securing component or the second magnetic handle securing component is a magnet and the other of the first magnetic handle securing component and the second magnetic handle securing component comprises ferrous metal.

10. The window operator handle and cover assembly of claim 6, wherein the shell further comprises a plurality of magnetic cover securing components, each one of a plurality of first magnetic cover securing components disposed so as to correspond with a separate one of a plurality of second magnetic cover securing components disposed on the window operator, wherein a mutual magnetic attraction between each of the first magnetic cover securing components and the corresponding second magnetic cover securing component secures the cover portion to the window operator.

11. A window operator assembly comprising:

a window operator adapted to couple with a movable sash of a window; and a window operator handle and cover assembly comprising:

a shell adapted to be received on the window operator, the shell having a first magnetic handle securing component, wherein the shell defines a recess adapted to receive a portion of the window operator, a housing defining a cavity being disposed within the recess, the first magnetic handle securing component being received in the cavity, and a handle portion coupled with a rotatable drive of the window operator, the handle portion being shiftable between a folded position in which a lower surface of the handle portion abuts an outer surface of the shell and an unfolded position in which the lower surface of the handle portion is spaced apart from the outer surface of the shell, the handle portion having a second magnetic handle securing component disposed proximate the first magnetic handle securing component when the handle portion is in the folded position, wherein a mutual magnetic attraction between the first magnetic handle securing component and the second magnetic handle securing component secures the handle portion in the folded position.

12. The window operator assembly of claim 11, wherein the first magnetic handle securing component and the second magnetic handle securing component are each magnets.

13. The window operator assembly of claim 11, wherein one of the first magnetic handle securing component or the second magnetic handle securing component is a magnet and the other of the first magnetic handle securing component and the second magnetic handle securing component comprises ferrous metal.

14. The window operator assembly of claim 11, wherein at least one of the first magnetic handle securing component and the second magnetic handle securing component is a neodymium magnet.

15. The window operator assembly of claim 11, wherein the shell further comprises a plurality of magnetic cover securing components, each one of a plurality of first magnetic cover securing components disposed so as to correspond with a separate one of a plurality of second magnetic cover securing components disposed on the window operator, wherein a mutual magnetic attraction between each of the first magnetic cover securing components and the corresponding second magnetic cover securing component secures the cover portion to the window operator.

16. A window operator assembly comprising:

a window operator adapted to couple with a movable sash of a window; and a window operator handle and cover assembly comprising:

a shell adapted to be received on the window operator, the shell having a first magnetic handle securing component; and a handle portion coupled with a rotatable drive of the window operator, the handle portion being shiftable between a folded position in which a lower surface of the handle portion abuts an outer surface of the shell and an unfolded position in which the lower surface of the handle portion is spaced apart from the outer surface of the shell, the handle portion having a second magnetic handle securing component disposed proximate the first magnetic handle securing component when the handle portion is in the folded position, wherein a mutual magnetic attraction between the first magnetic handle securing component and the second magnetic handle securing component secures the handle portion in the folded position, and wherein the handle portion comprises a body defining a recess, a housing defining a cavity being disposed within the recess, the second magnetic handle securing component being received in the cavity.

17. The window operator assembly of claim 16, further comprising a bottom cover at least partially covering the recess in the body.

18. The window operator assembly of claim 16, wherein the first magnetic handle securing component and the second magnetic handle securing component are each magnets.

19. The window operator assembly of claim 16, wherein one of the first magnetic handle securing component or the second magnetic handle securing component is a magnet and the other of the first magnetic handle securing component and the second magnetic handle securing component comprises ferrous metal.

* * * * *